Dec. 5, 1967     H. THUM     3,355,990

HYDROSTATIC POSITIONING OF WORKTABLES OF MACHINE TOOLS

Filed Aug. 26, 1964

INVENTOR.
Helmut Thum
BY
James E. Bryan
ATTORNEY

United States Patent Office 3,355,990
Patented Dec. 5, 1967

3,355,990
HYDROSTATIC POSITIONING OF WORKTABLES OF MACHINE TOOLS
Helmut Thum, Obervellmar, Germany, assignor to Henschef-Werke A.G., Kassel, Germany, a corporation of Germany
Filed Aug. 26, 1964, Ser. No. 393,007
5 Claims. (Cl. 90—21)

It is known that the exact positioning of a heavy working carriage on a machine tool, for example, is frequently difficult because the force required to overcome the static friction often results in a movement of the carriage beyond the desired position, due to the fact that the frictional resistance decreases with movement of the carriage. It has already been proposed to raise the carriage by means of oil under pressure so this part of the machine tool can be moved to a desired position while floating on a hydrostatic cushion or pad, with the friction between the guide surfaces thereby being eliminated. In this known arrangement, the oil, which is continually supplied under high pressure, flows off freely between the guide surfaces and is collected in an oil tank.

After flowing off of the guide surfaces, the oil is liable to fouling by chips, shavings, and other foreign materials and is also subjected to mixing with other fluids, such as cooling and/or cutting liquids, for example. The result is that the serviceability of the lubricating system is impaired. In guide tracks of limited length, it is customary to use covers to protect the oil from fouling. However, where guide tracks having a long length are employed, such as those in drilling and milling machines, and in planing tables, for example, it is not possible to effectively cover the guides and protect them from chips, shavings, dust, cutting oil, cooling water, and the like.

The present invention overcomes the disadvantages of the heretofore known hydrostatic positioning devices in which the oil flows off freely since, in the present invention, oil under pressure is supplied to one or more pressure chambers through a system of conduits and the oil which is expelled from the pressure chambers is retained in a sealing zone between the guide surfaces of the machine part to be moved and the guiding machine part in a manner such that the oil under pressure, after being expelled from the pressure chambers, is collected in closed return conduits positioned in the machine part to be moved. More particularly, the present invention provides a pressure chamber and a bearing surface surrounding the latter, under which the oil under pressure flows, the bearing surface being surrounded by a sealing chamber which latter is sealed from the atmosphere by sealing means mounted between the guide surfaces of the machine part to be moved and the supporting machine part.

As noted above, the pressure chamber, together with the sealing means surrounding it, is preferably provided in the bearing surface of the machine part to be moved.

An additional advantage of the hydrostatic positioning apparatus of the present invention, using a sealed space surrounding the pressure chamber or chambers, is that with the simultaneous provision of guides at the upper and lower side of the machine part to be moved and using separate oil supplies, locking of the movable machine part may be accomplished by supplying oil under pressure to the lower chambers, whereby separate locking or clamping devices may be dispensed with.

The invention will be further illustrated by reference to the accompanying drawings in which.

Figure 1:
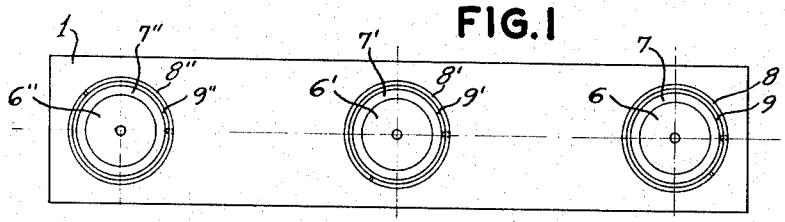
FIGURE 1 is a bottom view of a guide bar or worktable of a machine tool.
Figure 2:
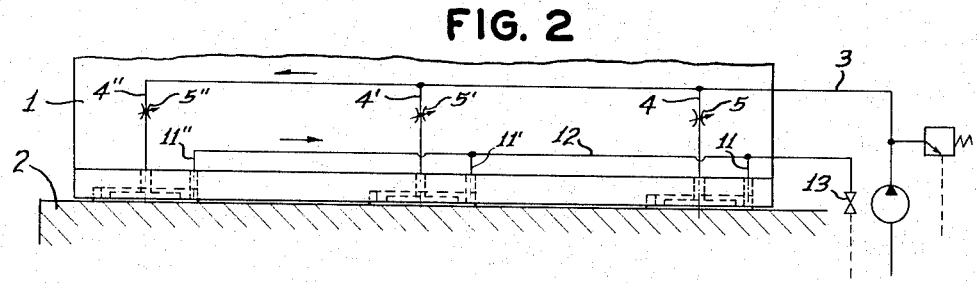
FIGURE 2 is a view in elevation of the guide bar or table of FIGURE 1 together with a guide track.

Referring to the drawings, the guide bar or worktable 1 of a machine tool is supported on a bed 2 and may be raised from the latter, for the purpose of being moved to a desired position, by means of oil under pressure. The oil under pressure is supplied from a pump, not shown, through a common distributing conduit 3 having three secondary conduits 4, 4', and 4" branching therefrom, each of the secondary conduits being provided with an adjustable resistance valve 5, 5', and 5", respectively, by means of which the pressure of the oil cushion or pad between the worktable 1 and the bed 2 is stabilized in case of a variation or fluctuation in the stress or load.

Figure 3:
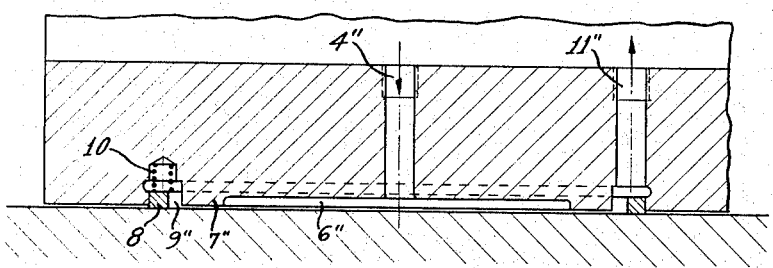
FIGURE 3 is a detail of a portion of FIGURE 2 at an enlarged scale.

The oil under pressure is passed through the valves 5, 5', and 5" and is introduced into the pressure chambers 6, 6', and 6", respectively, the pressure being increased until the annular gliding surfaces 7, 7', and 7" are lifted off of the bed 2. While losing pressure, the oil will then flow outwardly from the pressure chambers into the annular oil collecting chambers 9, 9', and 9", respectively, while being prevented from flowing radially outwardly beyond these latter chambers by the sealing rings 8, 8', and 8". In the embodiment shown, the sealing rings have an annular configuration and, as shown in FIGURE 3, are biased towards the bed 2 by means of the compression springs 10 in order to ensure firm contact with the bed 2 even after the movable worktable 1 has been lifted off of the bed 2. The contact may be obtained, if desired, exclusively by differential oil pressure.

The sealing rings 8 prevent the oil from flowing out between the table 1 and the bed 2 and, instead, cause it to flow into the annular collecting chambers 9, 9', and 9" which are concentrically disposed with respect to the secondary conduits 4, 4', and 4". The discharge conduits 11, 11', and 11", respectively, connect with the main oil collecting conduit 12. The main collecting conduit 12 is also provided with an adjustable resistance valve 13 by means of which the pressure of the collected oil may be regulated.

Figure 4:
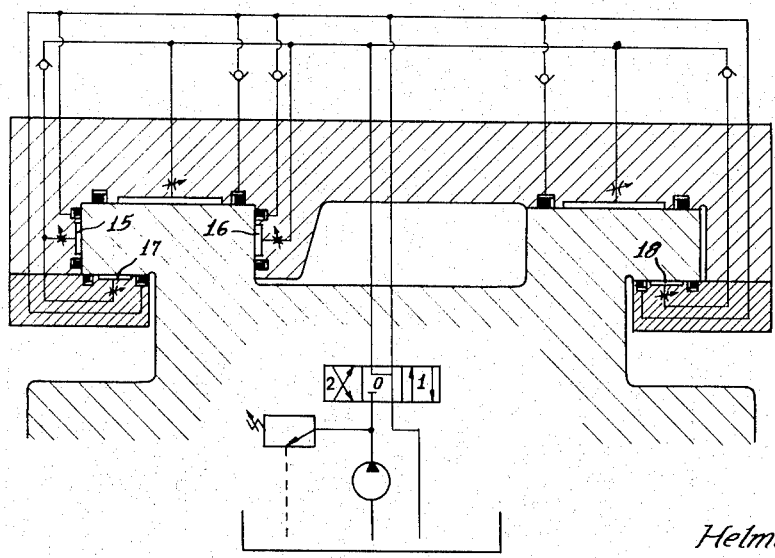
FIGURE 4 shows an embodiment of the present invention in which a movable machine part may be clamped into position by hydrostatic means.

As shown in FIGURE 4, clamping of the table to the machine bed may be effected hydrostatically using a slide valve, which is schematically shown. When the slide valve is in position 0, a condition of no pressure exists. When the slide valve is in position 1, hydrostatic positioning of the machine table may be effected since oil under pressure is supplied to the pressure chambers. When the valve is in position 2, clamping of the movable table is effected both by means of the two lateral chambers 15 and 16 as well as by the two chambers 17 and 18 in the lower guide member of the movable machine table, the lower guide member being indicated by the narrow cross hatching.

It will be obvious to those skilled in the art that many modifications may be made within the scope of the present invention without departing from the spirit thereof, and the invention includes all such modifications.

What is claimed is:

1. A hydrostatic positioning apparatus for the worktables of machine tools of the type wherein a worktable is raised from a guide by means of oil under pressure in order to eliminate frictional resistance, which comprises supply conduit means for supplying oil under pressure to a plurality of cylindrical pressure chambers in the worktable, each of which chambers is surrounded by an annular seal with an annular space being provided between each chamber and each seal, and conduit means for collecting the oil expelled from the pressure chambers.

2. An apparatus according to claim 1 in which the conduit means for collecting the oil connects to each annular space.

3. An apparatus according to claim 1 including hydrostatic means for locking the worktable in a desired position.

4. An apparatus according to claim 1 in which adjustable valve means is provided in the conduit means for collecting the oil expelled from the pressure chamber.

5. A method for the hydrostatic positioning of worktables on machine tools of the type wherein a worktable is raised from a guide by means of oil under pressure in order to eliminate frictional resistance, which comprises supplying oil under pressure to a plurality of pressure zones in the worktable and withdrawing oil from a plurality of sealing zones, one of which surrounds each pressure zone.

References Cited

UNITED STATES PATENTS

| 2,413,671 | 12/1946 | Wolf et al. | 308—3.5 |
| 2,520,879 | 8/1950 | Dall | 90—58 X |
| 2,788,862 | 4/1957 | Langer | 184—5 X |
| 3,076,524 | 2/1963 | Avallone et al. | 308—122 X |
| 3,097,893 | 7/1963 | White | 308—36.2 |

FOREIGN PATENTS

| 778,801 | 3/1954 | Great Britain. |

LEONIDAS VLACHOS, *Primary Examiner.*